United States Patent [19]
Mathauser

[11] 3,983,338
[45] Sept. 28, 1976

[54] APPARATUS AND METHOD TO TEST THE CONDITION OF AN ELECTRICAL SERVICE LINE AND TO DETERMINE THE PRESENCE AND/OR REMOVAL OF ELECTRICAL EQUIPMENT CONNECTED TO THE LINE

[76] Inventor: William R. Mathauser, Box 5, Sun Valley, Idaho 83353

[22] Filed: July 30, 1975

[21] Appl. No.: 600,512

Related U.S. Application Data

[63] Continuation-in-part of Ser. No. 398,593, Sept. 19, 1973, abandoned.

[52] U.S. Cl. .................... 179/175.2 C; 179/1 PC; 179/175
[51] Int. Cl.² .......................................... H04M 3/22
[58] Field of Search ...... 179/175.2 C, 175, 175.3 R, 179/190, 158, 81 R, 1 PC; 340/213, 408, 280, 421; 339/19

[56] References Cited
UNITED STATES PATENTS

| | | | |
|---|---|---|---|
| 3,513,261 | 5/1970 | Dal Monte | 179/1 PC |
| 3,526,729 | 9/1970 | Andrews et al. | 179/175.3 R |
| 3,660,620 | 5/1972 | Schimpf | 179/175.3 R |
| 3,663,769 | 5/1972 | Boatwright et al. | 179/175.3 R |
| 3,668,324 | 6/1972 | Firestone | 179/1 PC |
| 3,781,857 | 12/1973 | Stendig et al. | 340/280 |

Primary Examiner—Douglas W. Olms
Attorney, Agent, or Firm—Shoemaker and Mattare, Ltd.

[57] ABSTRACT

Apparatus, method and system to check the operability of an electrical service line, such as a telephone service line or other low voltage service line, between a test station and a telephone service installation or other electrical equipment connected to the line, even in the absence of any telephone set or other electrical equipment connected to the line at the service installation, including an electrical device connected to the line at the service installation to receive a signal transmitted thereto from the test station and to modify the signal returned to the test station to indicate the operability of the line and to modify the signal to indicate the presence or removal of any telephone set or other electrical equipment connected to the line at the service installation.

14 Claims, 8 Drawing Figures

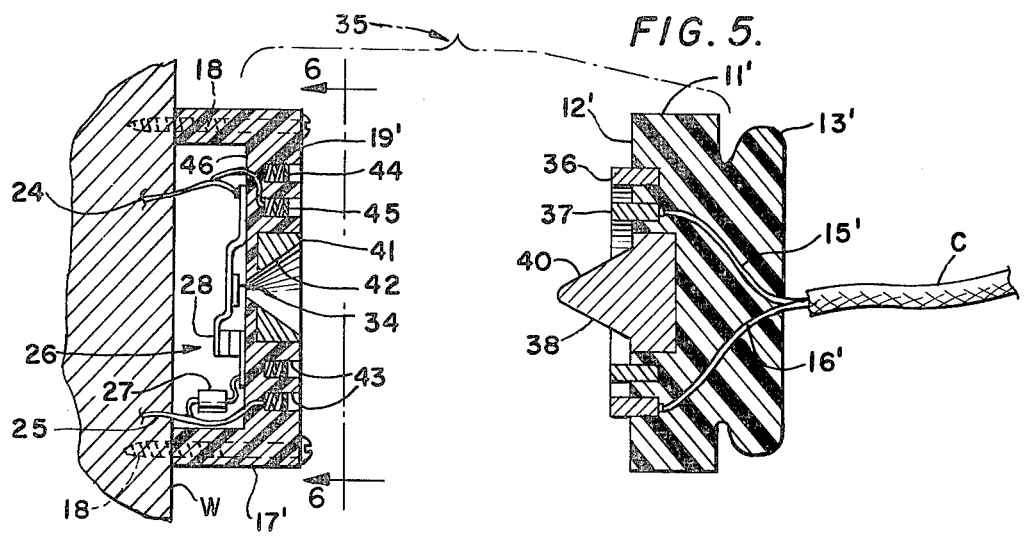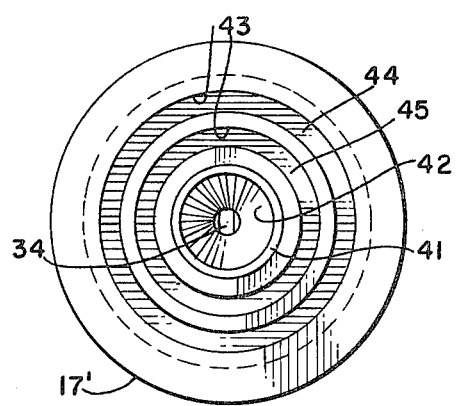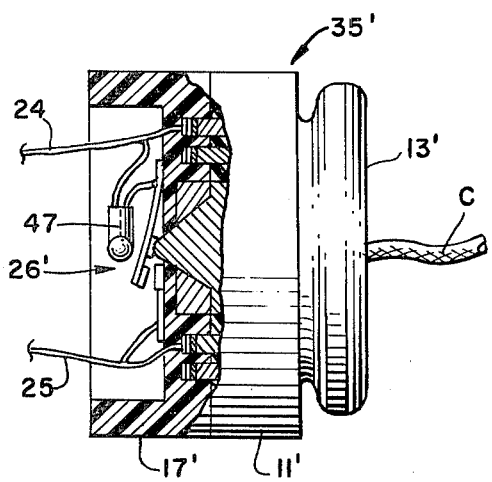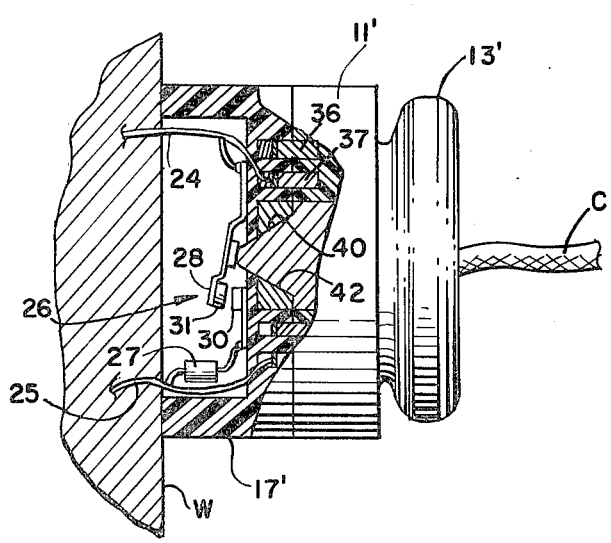

APPARATUS AND METHOD TO TEST THE CONDITION OF AN ELECTRICAL SERVICE LINE AND TO DETERMINE THE PRESENCE AND/OR REMOVAL OF ELECTRICAL EQUIPMENT CONNECTED TO THE LINE

BACKGROUND OF THE INVENTION

This application is a continuation-in-part application of Application Ser. No. 398,593, filed Sept. 19, 1973 now abandoned.

This invention relates to a means and method for checking telephone service lines or other electrical service lines, particularly for low voltage service, to determine the operability thereof, and also for detecting the presence of any telephones, or other electrical devices or equipment, authorized or unauthorized, connected to a service line, or for detecting the removal from the line of electrical equipment, such as a speaker and the like.

In the past, telephone companies, in particular, have lost a great amount of money due to the use by subscribers of one or more unauthorized telephone sets at a service installation. For exammple, a subscriber may subscribe to and pay for one telephone set and then the subscriber may obtain one or more sets from a source independent of the telephone company and attach these sets to his service line without the authorization or knowledge of the telephone company and without paying any service charges thereon. Thus, the telephone company receives reimbursement for service of only one telephone while the subscriber benefits from the use of two or more telephones. There is no satisfactory means known in the prior art by which the telephone company may determine by a routine check from a remote location or checking station whether or not a subscriber has connected an unauthorized telephone set or sets to the service line, if the subscriber has disconnected the bell in the unauthorized telephones. This is due to the fact that at the present time the bell ringing circuit in a telephone imposes a predetermined impedance or resistance in the line. The telephone service company regularly performs a routine check, in which it sends a signal through the line to the service installation and into the telephone and thus senses or measures the impedance or resistance in the line to determine the presence of the telephone connected to the line. Accordingly, if the subscriber disconnects the bell ringing circuit from the telephone, there is no way in which the telephone service company can obtain an indication or reading of any resistance in the line indicating the presence of the telephone. Of course, the telephone company could send servicemen or company representatives to various service installations to personally check to determine the number of telephones present at that service installation, but this would be prohibitively expensive and would involve other problems.

Moreover, in recent years the use of telephone jacks has become widespread, and a subscriber may subscribe to one or more telephones and may simply plug the telephone or telephones into a desired jack in a desired location at the service installation. This situation increases the problem of the use of unauthorized telephone sets, since the subscriber can merely plug an unauthorized telephone set into a jack at a desired location.

Another problem of a serious nature is the fact that when a residence is equipped with telephone jacks, as aforedescribed, the subscriber at the residence may disconnect all of his telephones in order not to be bothered or disturbed by the ring of the telephone, and when the telephone or telephones are thus disconnected, there is no way in which the telephone company can determine whether or not the service line to the residence is operable without sending a serviceman to the residence, and this involves a substantial cost to the telephone company.

With the present invention, the telephone company is enabled to quickly and easily determine both the operability of the service line to a service installation, even though there is no telephone set connected to the service line at the service installation, and to determine the presence and number of unauthorized telephone sets connected to the line at the service installation. This checking is accomplished from a test station, such as a main checking station remote from the service installation, and merely involves the transmittal of a signal, as heretofore done, over the line to the service installation and measuring the amount of deviation in the signal produced by the invention at the service installation.

Further, valuable equipment or devices, such as amplifiers, loud speakers, microphones, radios, and the like often must be left connected to electrical service lines, and are thus susceptible to being stolen or detached by accident or inadvertance, and the removal of such equipment from the line may not be detected promptly. The present invention enables the line and equipment connected thereto to be monitored and inspected from a remote checking station, even miles away, and an alarm system can be connected therewith to alert personnel to the condition of the line, or removal of equipment therefrom, even though the equipment may be switched off, or not actuated.

More particularly, the invention comprises an electrical device which is connected to the line at the service installation and which enables a first signal to be obtained when no telephone set or other electrical equipment is connected to the service installation and, further, to modify the signal when a telephone set or other electrical equipment is connected thereto to indicate the presence of the telephone or other electrical equipment.

In a preferred form of the invention, the electrical device comprises a simple resistance element or capacitor or the like which imposes a predetermined impedance on the service line, which is measurable by the person making the routine check of the line in order to determine both the condition of the line and the presence of any authorized and/or unauthorized telephone sets or other electrical equipment on the line.

OBJECTS OF THE INVENTION

It is an object of this invention to provide a means for determining from a remote test or checking station the condition of an electrical service line between the checking station and a service installation for electrical equipment, even when no electrical equipment is connected to the line at the service installation.

Another object of this invention is to provide a means for determining from a remote test or checking station the presence of any authorized and/or unauthorized telephone sets or other electrical equipment connected to a service line at a service installation.

A further object of this invention is to provide a means for determining from a remote test or checking station both the operability of a service line between the checking station and a service installation and the presence of any authorized and/or unauthorized electrical equipment, such as telephone sets, connected to the line at the service installation.

A still further object is to provide a means for determining from a remote location whether electrical equipment has been removed from an electric service line.

A still further object of the invention is to provide a method of accomplishing each of the above objects.

BRIEF DESCRIPTION OF THE DRAWINGS

FIG. 5 is a view similar to FIG. 1 of a modified telephone jack and plug incorporating the present invention.

FIG. 6 is a view taken along line 6—6 in FIG. 5.

FIG. 7 is a view of the jack and plug of FIG. 5 shown in coupled relationship.

FIG. 8 is a view similar to FIG. 7 of a modified form of the invention.

DETAILED DESCRIPTION OF THE INVENTION

Figure 1:
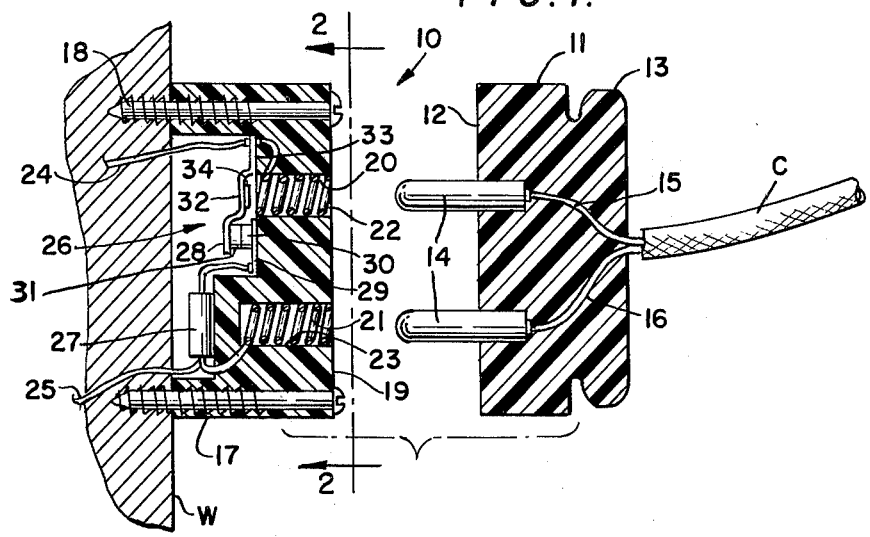
FIG. 1 is an exploded view in section of a telephone jack and plug embodying the present invention.
Figure 2:
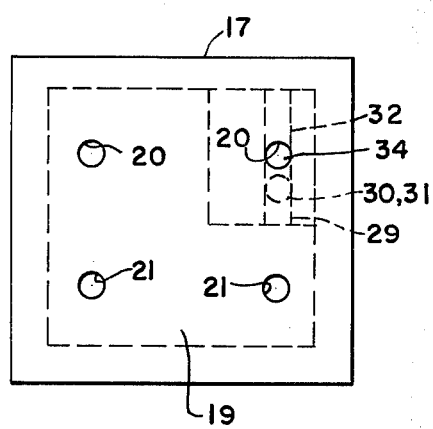
FIG. 2 is a view taken along line 2—2 in FIG. 1.

In the drawings, wherein like reference numerals indicate like parts throughout the several views, a telephone coupler or jack and plug of substantially conventional construction are indicated generally at 10 in FIG. 1 and comprise a plug 11, comprising a suitable electrical insulating material and with a substantially flat, smooth front face 12 and a handle or grip means 13 on the rear face thereof. A plurality of electrical contacts or prongs 14 project forwardly from the body at the front face 12 thereof, and the prongs are connected through a pair of wires or electrical leads 15 and 16 and an electrical cable C to a suitable telephone set or instrument (not shown).

A female half or jack 17 of the coupler 10 is affixed to a wall W or the like by means of a plurality of suitable fasteners, such as screws 18 or the like, extended through the jack 17 into the wall W. The jack or female coupling half 17 also comprises a body of suitable electrical insulating material and has a substantially flat, planar front face 19 with a plurality of contact receptive sockets 20 and 21 therein, in which are disposed spring type contacts 22 and 23, respectively, for engagement by the prongs 14 on the male coupling half or plug 11 to establish electrical connection between the halves when they are coupled together. The spring contacts 22 and 23 are connected to a pair of wires 24 and 25, respectively, leading to a source of energy or service line for the telephone installation.

A device 26, in accordance with the invention, is connected across the wires 24 and 25 in parallel with the contacts 22 and 23 to enable a telephone service company to readily ascertain the operability of the service line, even when the male coupling half 11 is disconnected from the female coupling half 17, and also enables the telephone service company to readily ascertain or determine the presence of any telephone sets connected to the service line, whether they are authorized or unauthorized, and whether the bells are connected or disconnected in the telephone sets. The device 26 includes a suitable impedance means, such as resistance element or capacitor or the like 27 for imposing a predetermined impedance on the service line, and a switch 28 for selectively connecting and disconnecting the resistance or impedance or the like from the service line. The switch 28 includes a contact base plate 29 connected to the capacitor or resistance element or the like 27 and a contact point 30 affixed to one end of the plate 29. A similar contact point 31 is affixed to one end of a leaf spring member 32, which is fixed at its other end 33 to the female coupling half 17 and is normally urged into the closed position with contact points 30 and 31 in electrically conducting engagement, as shown in FIG. 1. A suitable electrical insulating pad 34 of a material such as felt or the like is affixed to the leaf spring 32 intermediate its ends and in registry with the socket 20 through the female coupling half in a position to be engaged by one of the contact prongs 14 on the male coupling half when the coupling halves are joined together, as in FIG. 3, to disengage the contact points 30 and 31 and thus disconnect the resistor or capacitor or the like 27 from the service line.

The capacitor or resistance element or the like 27 is selected to have a value such as to impose a predetermined impedance of any suitable value to obtain an indication of the presence of a telephone on the service line and the operability of the service line as aforesaid. Preferably, the impedance is either above or below that of the telephone set, and it may include a fractional impedance to render it more difficult to circumvent.

Thus, with the device as described above, and with the jack disconnected, as in FIG. 1, the resistor or capacitor or like 27 imposes a predetermined impedance on the service line and the service company or telephone company is enabled to make a routine check of the service line merely by transmitting a signal over the service line and to the device 26. The switch 28 being closed results in the impedance of the capacitor or resistor or the like being imposed on the line and thus this impedance is indicated at the checking station and it can be determined from the value of the impedance measured at the checking station whether the service line is operable or not.

Figure 3:
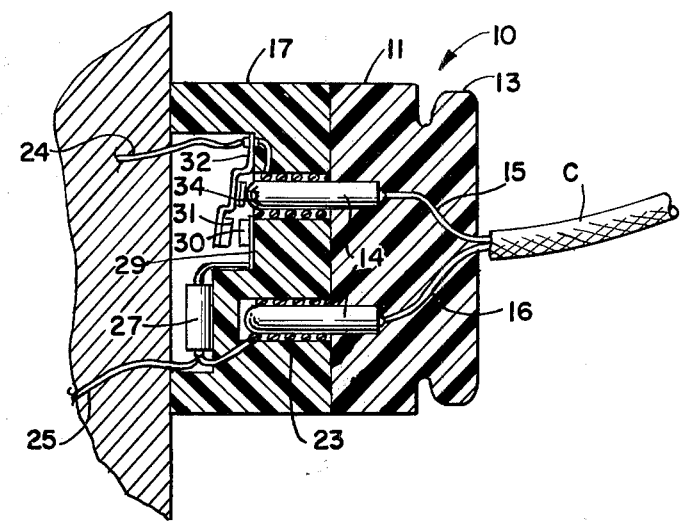
FIG. 3 is a sectional view of the jack and plug of FIG. 1 showing the jack and plug coupled together.

Further, if the jack is connected, as in FIG. 3, to connect a telephone set to the service line, the switch 28 is opened, thus removing the resistor or capacitor or the like 27 from the line, and if the bell in the telephone connected thereto is not disconnected, then the resistance or impedance offered by the bell is measured at the checking station to indicate the presence of a telephone, and if the bell is disconnected, then the removal of the resistor or capacitor or the like 27 from the line is registered at the checking station to give an indication of a change in the impedance in the line, and thus to indicate that a telephone set has been connected to the service line.

Figure 4:
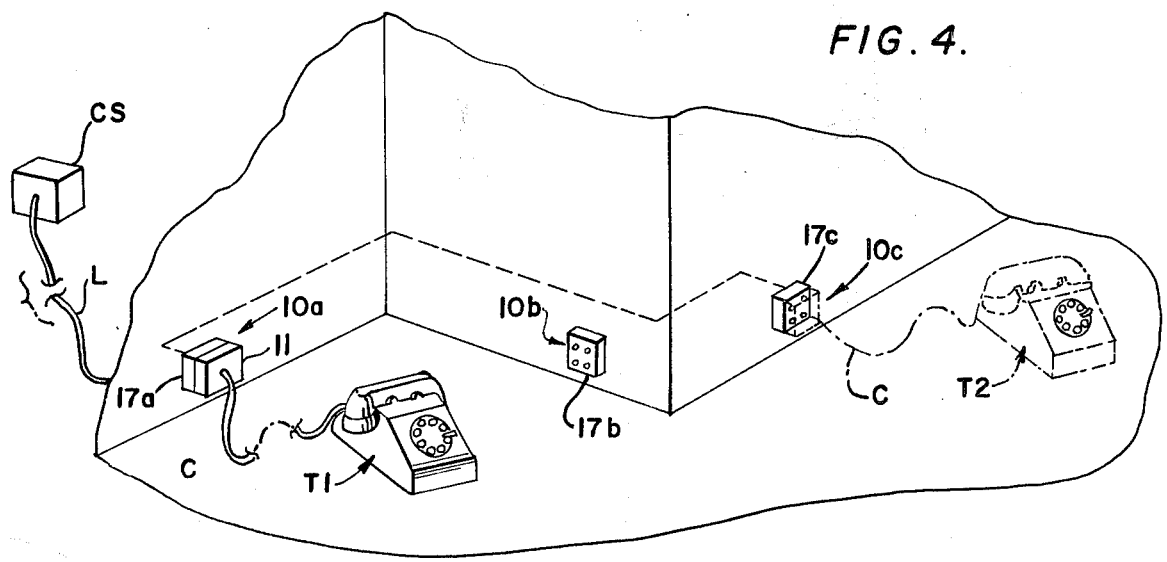
FIG. 4 is a diagrammatic, perspective, fragmentary view of a system embodying the present invention.

In FIG. 4, for example, a service line L extends from a checking station CS to a suitable service installation or residence R, where three couplers or jacks 10a, 10b and 10c are provided, and where only one authorized telephone T1 is connected via cord C to jack 10a. Assume that the value of the capacitor or resistor or the like 27 in each jack imposes an impedance of 1½ ohms on the service line and that the bell in telephone T1 imposes or has an impedance of 2 ohms, then with no telephone connected to any of the jacks 10a, 10b or 10c, a total impedance of 4½ ohms would be measured at the checking station CS. If telephone T1 is now connected to jack 10a, then the switch 28 is opened and the 1½ ohm resistance is removed and the 2 ohm resistance of the ringing circuit in the telephone T1 is imposed on the line, thus resulting in a total resistance or impedance reading at checking station CS of 5 ohms. Thus, for one authorized telephone at the installation R either one of two readings should be obtained at the checking station, i.e. 4½ ohms when no telephone set is connected and 5 ohms when one telephone set is connected. If the subscriber at service installation R decides to purchase an unauthorized telephone T2 and to connect it to the service line without knowledge of the telephone company in an attempt to avoid payment of the service charge on the telephone T2, then ordinarily the subscriber would disconnect the bell in telephone T2 and merely connect it to the service line. With the present invention, however, as soon as the cord C of telephone T2 is connected to jack 10c or 10b, a prong 14 of the plug opens the switch 28 in that jack and removes or open-circuits the 1½ ohm resistance or impedance connected across that service line, thus changing the signal measured at checking station CS by that amount, so that if the service line is checked to service installation R and one legal telephone T1 and one unauthorized telephone T2 are connected to the service line, as indicated in FIG. 4, a reading of 3½ ohms will be obtained, indicating the presence of the unauthorized telephone T2.

In FIGS. 5–7 a modified telephone coupler 35, embodying a device 26 in accordance with the invention, is illustrated and comprises a male coupling half or plug 11' having a substantially flat, planar front face 12' and a handle means 13' on the rear face thereof. However, rather than the plurality of forwardly axially projecting contact prongs 14, as in the FIG. 1 embodiment, a pair of annular, concentric contact rings 36 and 37 project forwardly from the front face 12' and the rings 36 and 37 are connected by means of a pair of wires 16' and 15', respectively, to a cord or the like C which leads to a telephone (not shown).

Also disposed in the front face 12' of male coupling half 11' is a magnet 38 having a conically shaped projection 40 projecting forwardly from face 12' in concentric relationship with contacts 36 and 37.

A female coupling half or jack 17' is suitably secured to a wall or the like W by means of a plurality or fastening means, such as screws 18, extended through the female coupling half into the wall and the coupling half 17' has a substantially flat, planar front face 19', in the center of which is secured a magnet means 41 having a conically shaped recess 42 extended therethrough. Also, a pair of annular, concentric, radially spaced apart grooves or channels 43 are disposed in concentric relationship to the magnet 41 and a pair of annular, ring-shaped floating electrical contacts 44 and 45 are disposed in the channels 43 for reception of the ring-shaped contacts 36 and 37 on the male coupling half or plug 11'. The rear face of female coupling half or jack 17' is recessed at 46 and the conical recess 42 in the magnet 41 extends and continues through the female coupling half 17' into the recess 46 at the rear thereof. Wires 24 and 25 are connected with the contacts 43, and a device 26, in accordance with the invention, and comprising a suitable resistor or capacitor or the like 27 and a switch 28, as aforedescribed, is connected between the wires 24 and 25, as before.

The use and operation of this form of the invention are substantially identical with the form of the invention illustrated in FIGS. 1–4, except that the coupling halves 11' and 17' may be coupled together in any relative rotational position therebetween because of the concentric annular relationship of the electrical contacts and of the magnet means for holding the coupling halves together.

In FIG. 8 a still further form of the invention is illustrated, and in this form of the invention, a suitable light emitting means 47, such as a light emitting diode, is substituted for the capacitor or resistor or the like 27 in the device 26'. In addition to providing a predetermined impedance in the service line connecteed with the coupler 35' of FIG. 8, the light emitting diode 47 provides a visual indication through the conical recess 42 opening into the recess 46 behind the female coupling half or jack 17' of the condition of the service line connected to the jack.

In other words, if the service line is operable and the coupling halves are disconnected, then the switch 28 is closed and the light emitting diode 47 is energized, thus projecting light through the conical recess 42.

The light emitting diode 47 could be used in conjunction with a suitable resistor or capacitor or the like 27, if desired, rather than used in lieu of the resistor or capacitor or the like.

Other types of telephone connectors than that described and illustrated herein may be utilized with the present invention, and other types of devices may be used to modify the signal transmitted to the service installation, rather than the particular resistance or capacitance elements described herein.

Further, while only three jacks have been illustrated in FIG. 4, it is to be understood that any number of jacks may be provided and the present invention will still provide an indication of the operability of the service line and of the presence of any unauthorized telephone on the service line.

Moreover, as noted previously, the present invention can equally as well be used to determine the operability of electric service lines to which loudspeakers, microphones, radios, or other electrical equipment is connected, and to determine whether any such electrical equipment has been disconnected or removed from the service line. For such electrical equipment, the signal imposed on the line would be selected so as to be compatible with the signal used in conjunction with operation of the particular electrical equipment, i.e. so as not to interfere with normal audio functions, or suitable filtering devices could be used. Additionally, more than one capacitor and the like could be used at the service installation.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. A telephone jack for selectively connecting and disconnecting a telephone set to a telephone service line, including impedance means and switch means connected in series across the service line in the jack, said switch means operable in response to connection of a telephone set thereto to remove the impedance from the line and thus modify a signal transmitted to the jack through the line to indicate the presence of the telephone set connected to the line.

2. A telephone jack for selectively connecting and disconnecting a telephone set to a telephone service line, including impedance means connected across the service line in the jack operable in response to a signal transmitted thereto through the line to modify the signal and indicate the operability of the line when no telephone set is connected thereto, and switch means connected in series with the impedance means in the jack and operable in response to connection of a telephone set thereto to remove the impedance from the line and thus modify a signal transmitted to the jack through the line to indicate the presence of the telephone set connected to the line.

3. Apparatus to determine the operability of a telephone service line between a checking station and a telephone service installation, and to detect the presence of any telephone set connected to the line at the service installation, comprising: electrical means operatively connected to the line at the service installation to give an indication of the condition of the line, even when no telephone set is connected to the line at the service installation, and to give an indication of the presence of any telephone set connected to the line at the service installation, said apparatus including a telephone coupler comprising a male coupling half and a female coupling half, one of said coupling halves being secured to a wall or the like and connected to said service line, and the other of said halves connected to a telephone set, said electrical means comprising a device in said one coupling half to impose an impedance across said service line whereby said impedance may be measured to determine the operability of the service line, and said coupling halves having cooperating means thereon to open-circuit said electrical means when said coupling halves are coupled together to thus remove said impedance from said line.

4. Apparatus as in claim 3, wherein said one coupling half comprises the female coupling half, said female coupling half having a pair of electrical contacts therein and a pair of wires leading from the service line to said electrical contacts, and said male coupling half has a pair of electrical contacts therein adapted to contact the electrical contacts in the female coupling half when the halves are coupled together to establish electrical connection between the service line and the telephone set, said electrical means including a resistance element connected in series with a switch and said switch and resistance element connected in parallel with said electrical contacts, said switch being normally closed when the coupling halves are separated, and said coupling halves having means thereon to operate said switch to open said switch when the coupling halves are connected together.

5. Apparatus as in claim 3, wherein said one coupling half comprises the female coupling half, said female coupling half having a pair of electrical contacts therein and a pair of wires leading from the service line to said electrical contacts, and said male coupling half has a pair of electrical contacts therein adapted to contact the electrical contacts in the female coupling half when the halves are coupled together to establish electrical connection between the service line and the telephone set, said electrical means including a capacitor connected in series with a switch and said switch and capacitor connected in parallel with said electrical contacts, said switch being normally closed when the coupling halves are separated, and said coupling halves having means thereon to operate said switch to open said switch when the coupling halves are connected together.

6. Apparatus as in claim 4, wherein said female coupling half has a recess in a rear face thereof, and said resistance element and switch are positioned in said recess.

7. Apparatus as in claim 5, wherein said female coupling half has a recess in a rear face thereof, and said capacitor and switch are positioned in said recess.

8. Apparatus as in claim 4, wherein said switch comprises a leaf spring and a contact point carried thereby, said leaf spring being resilient and normally urging said contact point into engagement with a like contact point fixedly carried by the female coupling half, an opening extended through the female coupling half in registry with the leaf spring, and a projection on the male coupling half adapted to extend through said opening to engage said leaf spring to disengage said contact points.

9. A system as in claim 3, wherein said electrical means comprises a resistance element to impose a predetermined resistance on said service line to thus change said signal received at the receiving means.

10. A system as in claim 3, wherein said electrical means comprises a device to impose an impedance on said service line to affect said signal received at said signal receiving means, and switch means connected with said device to selectively impose and remove said impedance from said line.

11. A system as in claim 10, wherein a projection is on said male coupling half and said female coupling half has an opening therethrough through which said projection is adapted to extend when said coupling halves are engaged, said switch being in registry with said opening and including means engagable by said projection when said coupling halves are engaged to disengage said switch and remove said impedance from said service line.

12. Apparatus to determine the operability of an electric service line between a checking station and a service installation for electrical equipment, and to detect the presence of electrical equipment connected to the line at the service installation, comprising: electrical means operatively connected to the line at the service installation to give an indication of the condition of the line, even when no electrical equipment is connected to the line at the service installation, and to give an indication of the presence of any electrical equipment connected to the line at the service installation, said apparatus including a coupler comprising a male coupling half and a female coupling half, one of said coupling halves connected to said service line, and the other of said halves connected to electrical equipment, said electrical means comprising a device in said one coupling half to impose an impedance across said service line whereby said impedance may be measured to determine the operability of the service line, and said coupling halves having cooperating means thereon to opencircuit said electrical means when said coupling halves are coupled together to thus remove said impedance from said line.

13. A coupling device for selectively connecting and disconnecting electrical equipment to a service line, including impedance means and switch means connected in series across the service line in the coupling device, said switch means operable in response to connection of electrical equipment thereto to remove the impedance from the line and thus modify a signal transmitted to the coupling device through the line to indicate the presence of the electrical equipment connected to the line.

14. A coupling device for selectively connecting and disconnecting electrical equipment to a service line, including impedance means connected across the service line in the coupling device operable in response to a signal transmitted thereto through the line to modify the signal and indicate the operability of the line when no electrical equipment is connected thereto and to indicate the removal of electrical equipment from the service line at said coupling device, and switch means connected in series with the impedance means in the coupling device and operable in response to connection of electrical equipment thereto to remove the impedance from the line and thus modify a signal transmitted to the coupling device through the line to indicate the presence of the electrical equipment connected to the line.

* * * * *